US011261970B2

(12) United States Patent
Henmi

(10) Patent No.: US 11,261,970 B2
(45) Date of Patent: Mar. 1, 2022

(54) SEALING DEVICE

(71) Applicant: NOK CORPORATION, Tokyo (JP)

(72) Inventor: Kota Henmi, Aso (JP)

(73) Assignee: NOK CORPORATION

( * ) Notice: Subject to any disclaimer, the term of this patent is extended or adjusted under 35 U.S.C. 154(b) by 125 days.

(21) Appl. No.: 16/621,143

(22) PCT Filed: May 25, 2018

(86) PCT No.: PCT/JP2018/020134
§ 371 (c)(1),
(2) Date: Dec. 10, 2019

(87) PCT Pub. No.: WO2018/230306
PCT Pub. Date: Dec. 20, 2018

(65) Prior Publication Data
US 2020/0173560 A1    Jun. 4, 2020

(30) Foreign Application Priority Data

Jun. 13, 2017   (JP) .............................. JP2017-116202

(51) Int. Cl.
*F16J 15/3268*   (2016.01)
*F16J 15/00*     (2006.01)
*F16J 15/06*     (2006.01)

(52) U.S. Cl.
CPC ......... *F16J 15/3268* (2013.01); *F16J 15/002* (2013.01); *F16J 15/062* (2013.01)

(58) Field of Classification Search
USPC ......................................................... 277/573
See application file for complete search history.

(56) References Cited

U.S. PATENT DOCUMENTS 3,362,720 A * 1/1968 Henry .................... F16J 15/166
                                                    277/638
3,718,338 A * 2/1973 Traub ....................... F16J 15/56
                                                    277/584

(Continued)

FOREIGN PATENT DOCUMENTS

CN         103998834 A    8/2014
CN         205361136 U    7/2016

(Continued)

*Primary Examiner* — Nathan Cumar
(74) *Attorney, Agent, or Firm* — Harness, Dickey & Pierce, P.L.C.

(57) ABSTRACT

A sealing device has a seal ring in a groove having a step, a first backup ring at the step in the groove, and a second backup ring, in the groove, between both rings offset from the step. The first backup ring includes a bottom-surface-side peripheral surface facing the step's bottom surface, an end surface facing the step's non-sealed-fluid-side side surface, a peripheral surface adjacent to the other member and facing the other member, and a slope facing the second backup ring. The length of the bottom-surface-side peripheral surface is equal to or smaller than the length of the bottom surface of the step. The second backup ring includes a peripheral surface facing the bottom surface of the groove, an end surface facing the non-sealed-fluid-side side surface of the groove, a slope facing the slope of the first backup ring, and a sealed-fluid-side end surface facing the seal ring.

3 Claims, 4 Drawing Sheets

(56) References Cited

U.S. PATENT DOCUMENTS

| | | | | |
|---|---|---|---|---|
| 3,854,735 A | * | 12/1974 | Maurer | F16J 15/166 |
| | | | | 277/638 |
| 4,034,993 A | * | 7/1977 | Okada | F16J 15/166 |
| | | | | 277/611 |
| 9,080,672 B2 | | 7/2015 | Matsumoto et al. | |
| 2015/0360660 A1 | | 12/2015 | Matsumura et al. | |
| 2016/0356381 A1 | | 12/2016 | Henmi et al. | |

FOREIGN PATENT DOCUMENTS

| | | | |
|---|---|---|---|
| GB | 1 213 152 A | 11/1970 | |
| JP | H08-135795 A | 5/1996 | |
| JP | H09-303579 A | 11/1997 | |
| JP | H10-068467 A | 3/1998 | |
| WO | WO-2014-119611 A1 | 8/2014 | |
| WO | WO-2015-133595 A1 | 9/2015 | |
| WO | WO-2015133595 A1 * | 9/2015 | F02M 55/004 |

\* cited by examiner

1

SEALING DEVICE

CROSS REFERENCE TO RELATED APPLICATIONS

This application is a U.S. National Phase application of International Application No. PCT/JP2018/020134, filed on May 25, 2018 and published in Japanese as WO-2018/230306 on Dec. 20, 2018 and claims priority to Japanese Patent Application No. 2017-116202, filed on Jun. 13, 2017. The entire disclosures of the above applications are expressly incorporated by reference herein.

BACKGROUND

Technical Field

The disclosure relates to a sealing device associated with a sealing technology. The sealing device in accordance with the disclosure is suitably used especially as a high pressure seal for sealing a high-pressure sealed fluid.

Related Art

As a high pressure seal, a sealing device 101 illustrated in FIG. 3 has conventionally been known. The sealing device 101 is disposed between two members, 151 and 152, which face each other, to seal a sealed fluid on a high pressure side H, so that the sealed fluid does not leak to a low pressure side L. The sealing device 101 is composed of a seal ring 111 which is mounted in a circular mounting groove 153 provided in one member (e.g. a shaft) 151 of one of the two members 151 and 152 and which is brought in close contact with the other member (e.g. a housing) 152, and a combination of a first backup ring 121 which is disposed on a non-sealed-fluid side (the low pressure side) L of the seal ring 111 and which is relatively hard, and a second backup ring 131 which is disposed between the seal ring 111 and the first backup ring 121 and which is relatively soft.

The mounting groove 153 is easily machined, so that the groove has a rectangular section. The first backup ring 121 is formed to have a triangular section and is provided with a perpendicular-to-axis planar end surface 121a facing a non-sealed-fluid-side side surface 153b of the mounting groove 153, a cylindrically shaped peripheral surface 121b facing the other member 152, and a slope 121c which intersects with the end surface 121a and the peripheral surface 121b. The second backup ring 131 is provided with a perpendicular-to-axis planar end surface 131a facing the seal ring 111, a cylindrically shaped peripheral surface 131b facing a bottom surface 153a of the mounting groove 153, and a slope 131c provided, matching the slope 121c of the first backup ring 121. As with the first backup ring 121, the second backup ring 131 is also formed to have a triangular section.

In the sealing device 101 having the foregoing configuration, the first backup ring 121 disposed on the non-sealed-fluid side (the low pressure side) L of the seal ring 111 makes it possible to prevent the seal ring 111 made of a rubber-like elastic material from protruding to a gap 154 between the two members 151 and 152 and consequently being damaged when the seal ring 111 is subjected to a high pressure P. Further, in the sealing device 101, the second backup ring 131 disposed between the seal ring 111 and the first backup ring 121 makes it possible to prevent the seal ring 111 from protruding to a gap (not illustrated) between the first backup ring 121 and the other member 152 and consequently being damaged.

In the foregoing sealing device 101, the following inconveniences are pointed out due to the simple triangular shapes of the sections of both the first backup ring 121 and the second backup ring 131.

To install the sealing device 101 between the two members 151 and 152, the sealing device 101 is first installed in the mounting groove 153 of the one member 151 and then the sealing device 101 is inserted together with the one member 151 into the inner periphery (a shaft hole 152a) of the other member 152 (arrow x), as illustrated in FIG. 4A. At this time, the following event occurs, because an outer diameter dimension $d_1$ of the seal ring 111 before the insertion is larger than an inner diameter dimension $d_2$ of the shaft hole 152a.

As illustrated in FIG. 4B, at the insertion, the outer periphery of the seal ring 111 interferes with an opening peripheral edge 152b of the shaft hole 152a. At this time, while the insertion of the seal ring 111 is temporarily stopped, the insertion of the one member 151 and the first backup ring 121 and the second backup ring 131, which are pushed by the one member 151, is continued (the arrow x), so that an interval t between the side surface 153b of the mounting groove 153 and the seal ring 111 is gradually decreased.

In the second backup ring 131, a corner 131d between the peripheral surface 131b and the slope 131c has an acute angle, and the corner 131d having the acute angle tends to be compressed in an axial direction when pressed against the side surface 153b of the mounting groove 153. Hence, as the interval t between the side surface 153b of the mounting groove 153 and the seal ring 111 is decreased, the second backup ring 131 is compressed and deformed, and the entire second backup ring 131 is moved toward the side surface 153b of the mounting groove 153, pressing the first backup ring 121. The two backup rings 121 and 131 are in contact at the slopes 121c and 131c, so that, when the second backup ring 131 presses the first backup ring 121, the first backup ring 121 is subjected to component forces in the directions of arrows y, and is deformed, increasing the outer diameter dimension thereof.

If the insertion of the first backup ring 121 is further continued in the deformed state with the increased diameter, then the outer periphery thereof interferes with the opening peripheral edge 152b of the shaft hole 152a, thus causing the first backup ring 121 to be damaged in some cases.

An object of the disclosure is to restrain damage to a first backup ring caused by an increase in the diameter of the first backup ring when inserting one member into the other member in a sealing device which is formed of a seal ring and the combination of a first backup ring and a second backup ring, the sealing device being attached to one of the two members.

SUMMARY

A sealing device includes: a seal ring which is installed in a mounting groove provided in one member of two members facing each other and which is brought in close contact with the other member; a first backup ring disposed at a step which is provided on a non-sealed-fluid side in the mounting groove and which decreases a groove depth; and a second backup ring which is disposed, in the mounting groove, between the seal ring and the first backup ring at a part other than the step and which is softer than the first backup ring, wherein the first backup ring has: a bottom-surface-side peripheral surface which faces a bottom surface of the step and an axial length of which is set to a length that is equal to or less than an axial length of the bottom surface of the step; an end surface facing a non-sealed-fluid-side side surface of the step; a peripheral surface which is adjacent to the other member and which faces the other member; and a slope which inclines such that the axial length of the bottom-surface-side peripheral surface is shorter than the axial length of the peripheral surface adjacent to the other member, and the second backup ring has: a peripheral surface facing a bottom surface of the mounting groove; a non-sealed-fluid-side end surface facing a non-sealed-fluid-side side surface of the mounting groove; a slope facing the slope of the first backup ring; and a sealed-fluid-side end surface facing a non-sealed-fluid-side side surface of the seal ring.

Effect

The sealing device can restrain damage to a first backup ring caused by an increase of the diameter of the first backup ring when inserting one member into the other member in a sealing device which is formed of a seal ring and the combination of a first backup ring and a second backup ring, the sealing device being attached to one of the two members.

DETAILED DESCRIPTION

Figure 1:
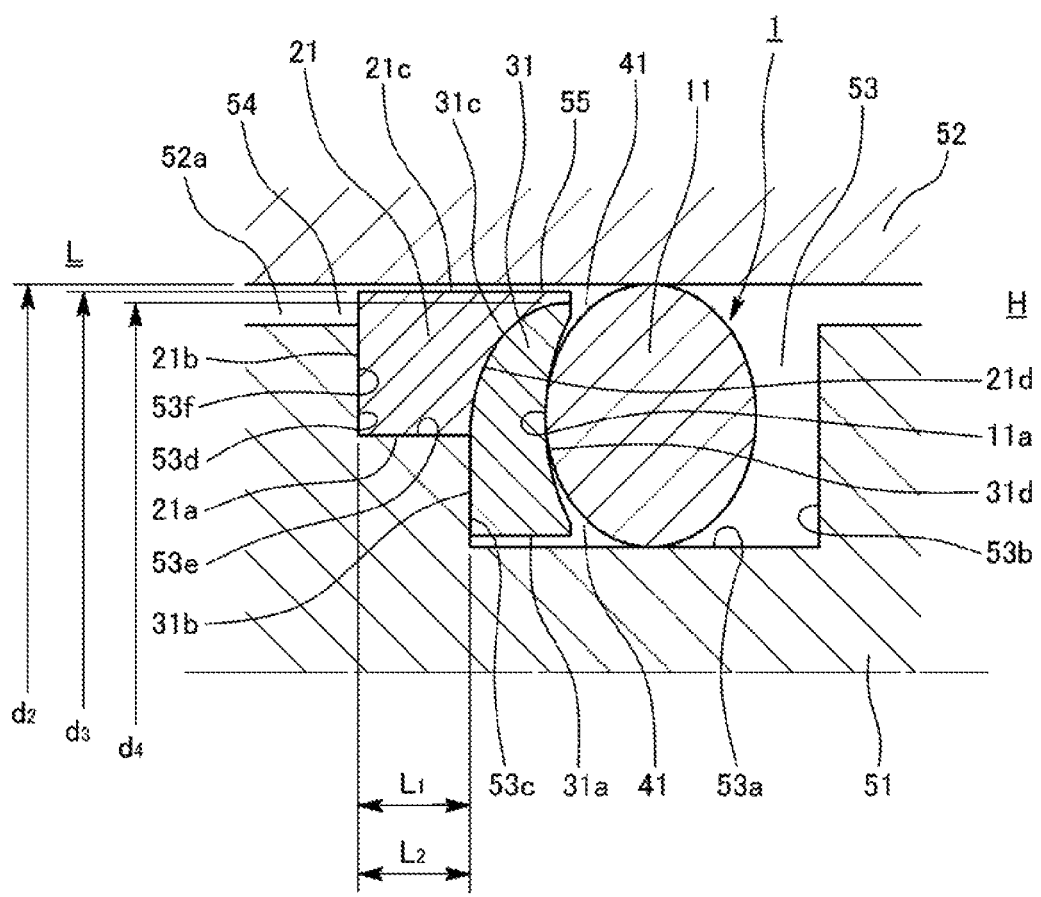
FIG. 1 is a sectional view of an essential section of a sealing device illustrating an embodiment.

FIG. 1 illustrates the section of an essential part of a sealing device 1 according to an embodiment. The sealing device 1 according to the embodiment is used for a high pressure seal in hydraulic equipment, such as a direct injection injector.

The sealing device 1 is disposed in a circular gap between a shaft (one member) 51 and a housing (the other member) 52, which are two members facing each other, to prevent a sealed fluid existing on a high pressure side (a sealed-fluid side) H on the right in the drawing from leaking to a low pressure side (a non-sealed-fluid side) L on the left in the drawing. The sealing device 1 has an O-ring 11, which is a seal ring that is installed in a circular mounting groove 53 provided in the peripheral surface of the shaft 51 and is in close contact with the inner peripheral surface of the shaft hole of the housing 52, a first backup ring 21 which is disposed on the non-sealed-fluid side L of the O-ring 11 and which is also installed in the mounting groove 53, and a second backup ring 31 which is disposed between the O-ring 11 and the first backup ring 21 and which is also installed in the mounting groove 53. The O-ring 11 may be replaced by a D-ring, an X-ring or other seal rings having different sectional shapes.

The O-ring 11 is formed of a rubber-like elastic material. The first backup ring 21 is formed of, for example, a nylon resin, which is harder than the second backup ring 31. The second backup ring 31 is formed of, for example, a PTFE resin, which is softer than the first backup ring 21.

The mounting groove 53 is easily machined, and is therefore formed into a rectangular groove having a rectangular section. The mounting groove 53 is provided with a step 53$d$ having a rectangular section that decreases the depth of the groove, the step 53$d$ being provided on a non-sealed-fluid-side side surface 53$c$. The mounting groove 53 includes a cylindrically shaped bottom surface 53$a$, a sealed-fluid-side side surface 53$b$ which is shaped like a plane perpendicular to axis, and a non-sealed-fluid-side side surface 53$c$ which is also shaped like a plane perpendicular to axis. The step 53$d$ has a cylindrically shaped bottom surface 53$e$ and a non-sealed-fluid-side side surface 53$f$ which is shaped like a plane perpendicular to axis. The diameter dimension of the bottom surface 53$e$ of the step 53$d$ is set to be larger than that of the bottom surface 53$a$ of the mounting groove 53. The non-sealed-fluid-side side surface 53$c$ of the mounting groove 53 may be inclined toward the sealed-fluid side H.

The first backup ring 21 is adapted to be installed at the step 53$d$ in the mounting groove 53, and includes a cylindrically shaped inner peripheral surface 21$a$, which is the bottom-surface-side peripheral surface facing the bottom surface 53$e$ of the step 53$d$, an end surface 21$b$ which faces a non-sealed-fluid-side side surface 53$f$ of the step 53$d$ and which is shaped like a plane perpendicular to axis, a cylindrically shaped outer peripheral surface 21$c$, which is the peripheral surface adjacent to the other member and which faces the inner peripheral surface of the shaft hole of the housing 52, and a slope 21$d$ having a tapered surface that inclines such that the axial length of the inner peripheral surface 21$a$ is shorter than the axial length of the outer peripheral surface 21$c$. The sectional shape of the first backup ring 21 is basically trapezoidal or substantially trapezoidal. The tapering direction of the slope 21$d$ is such that the diameter dimension (the inner diameter dimension) thereof gradually decreases from the sealed-fluid side (the high pressure side) H toward the non-sealed-fluid side (the low pressure side) L.

The second backup ring 31 is installed to the main body of the mounting groove 53 rather than the step 53$d$. The second backup ring 31 includes a cylindrically shaped inner peripheral surface 31$a$, which is the peripheral surface facing the bottom surface 53$a$ of the mounting groove 53, a non-sealed-fluid-side end surface 31$b$ which is shaped like a planar perpendicular to axis and which faces the non-sealed-fluid-side side surface 53$c$ of the mounting groove 53, a slope 31$c$ facing the slope 21$d$ of the first backup ring 21, and a sealed-fluid-side end surface 31$d$ facing a non-sealed-fluid-side side surface 11$a$ of the O-ring 11. The sectional shape of the second backup ring 31 is basically trapezoidal or substantially trapezoidal. The slope 31$c$ is provided, matching the slope 21$d$ of the first backup ring 21, and the tapering direction is such that the diameter dimension (the outer diameter dimension) thereof gradually decreases from the sealed-fluid side (the high pressure side) H toward the non-sealed-fluid side (the low pressure side) L. The slope 31$c$ is provided continuously along the outer periphery of the non-sealed-fluid-side end surface 31$b$.

An outer diameter dimension $d_3$ of the first backup ring 21 is set to be smaller than an inner diameter dimension $d_2$ of the housing 52, so that the first backup ring 21 does not interfere with the shaft hole opening peripheral edge (not illustrated) of the housing 52 when the sealing device 1 is inserted into a shaft hole 52a of the housing 52. An outer diameter dimension $d_4$ of the second backup ring 31 is also set to be smaller than the inner diameter dimension $d_2$ of the housing 52, so that the second backup ring 31 does not interfere with the shaft hole opening peripheral edge (not illustrated) of the housing 52 when the sealing device 1 is inserted into the shaft hole 52a of the housing 52.

An axial length $L_1$ of the inner peripheral surface 21a, which is the inner periphery of the first backup ring 21, is set to be equal to an axial length $L_2$ of the bottom surface 53e of the step 53d or smaller than the axial length $L_2$ ($L_1 \leq L_2$).

The slope 21d of the first backup ring 21 is formed to have a concave arc-shaped surface in a sectional view. The slope 31c of the second backup ring 31 is formed to have a convex arc-shaped surface in a sectional view. The curvature radii of the two slopes 21d and 31c are set to be the same. This enables the two slopes 21d and 31c to be in surface contact over the whole surfaces.

The sealed-fluid-side end surface 31d of the second backup ring 31 is formed as a concave arc-shaped surface in a sectional view. The non-sealed-fluid-side side surface 11a of the O-ring 11 is formed as a convex arc-shaped surface in a section view. The curvature radius of the sealed-fluid-side end surface 31d of the second backup ring 31 is set to be larger than the curvature radius of the non-sealed-fluid-side side surface 11a of the O-ring 11. Therefore, in an initial state in which any pressure or external force has not yet been applied to the sealing device 1, the O-ring 11 is in contact with only the radial central part of the second backup ring 31 and not in contact with the outer periphery and the inner periphery of the second backup ring 31, thus forming an initial axial gap 41.

In the sealing device 1 having the foregoing configuration, the first backup ring 21 is disposed on the non-sealed-fluid side L of the O-ring 11, thus making it possible to prevent the O-ring 11 from protruding to a radial gap 54 between the shaft 51 and the housing 52 and being damaged when the O-ring 11 is subjected to a high pressure P. The sealing device 1 further has the second backup ring 31 disposed between the O-ring 11 and the first backup ring 21, thus making it possible to prevent the O-ring 11 from protruding to a radial gap 55 between the first backup ring 21 and the housing 52 and being damaged. Hence, the deterioration of sealing performance caused by the O-ring 11 protruding to the gaps 54 or 55 and being damaged can be suppressed.

In the sealing device 1, the non-sealed-fluid-side end surface 31b facing the non-sealed-fluid-side side surface 53c of the mounting groove 53 is provided on the second backup ring 31. By keeping the non-sealed-fluid-side end surface 31b in contact with the non-sealed-fluid-side side surface 53c of the mounting groove 53 from the beginning of the installation, the second backup ring 31 does not move in the mounting groove 53 toward the non-sealed-fluid side L and therefore does not press the first backup ring 21 even when the entire second backup ring 31 is pressed by the O-ring 11. In addition, the outer periphery of the second backup ring 31 is not pressed by the O-ring 11 until the initial axial gap 41 formed between the outer periphery and the O-ring 11 disappears, so that the outer periphery of the second backup ring 31 does not press the first backup ring 21. Thus, when inserting the sealing device 1 into the shaft hole 52a of the housing 52, the second backup ring 31 does not press the first backup ring 21, so that the first backup ring 21 does not incur deformation that increases the outer diameter dimension $d_3$ thereof. Therefore, the situation in which the first backup ring 21 interferes with the opening peripheral edge of the shaft hole 52a at the insertion does not take place, thus making it possible to restrain the damage to the first backup ring 21 attributable to the interference.

Figure 2:
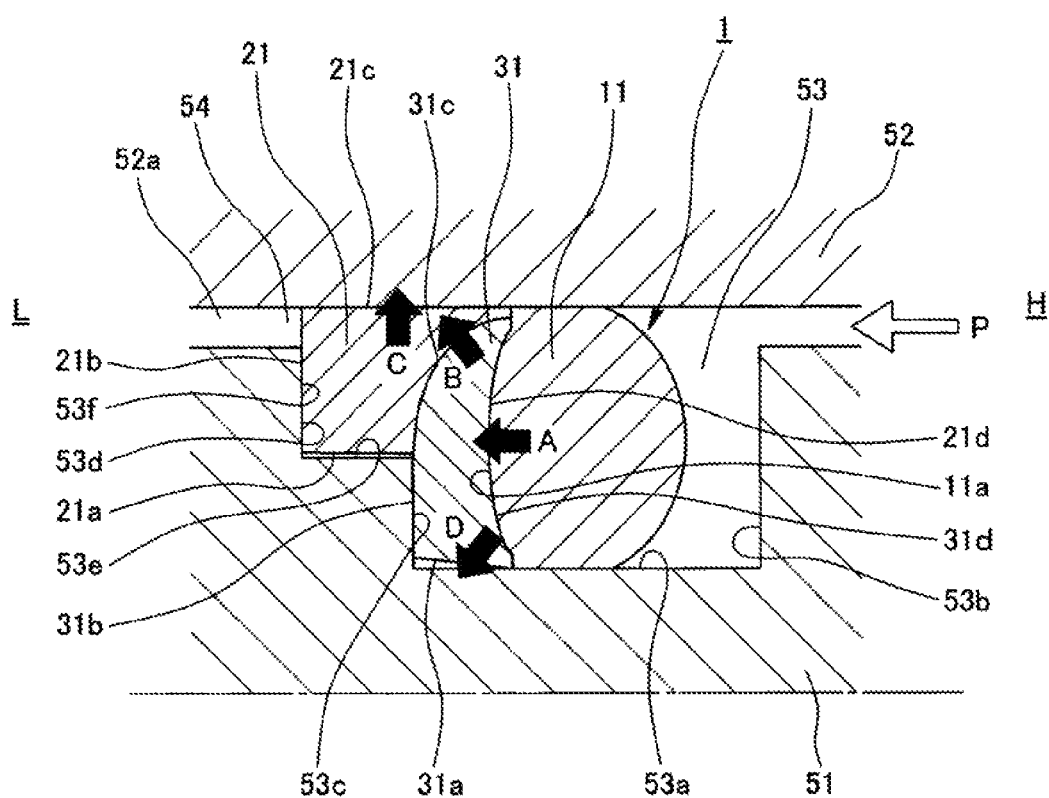
FIG. 2 is a sectional view of an essential section illustrating a state in which a high pressure is being applied to the sealing device.
Figure 3:
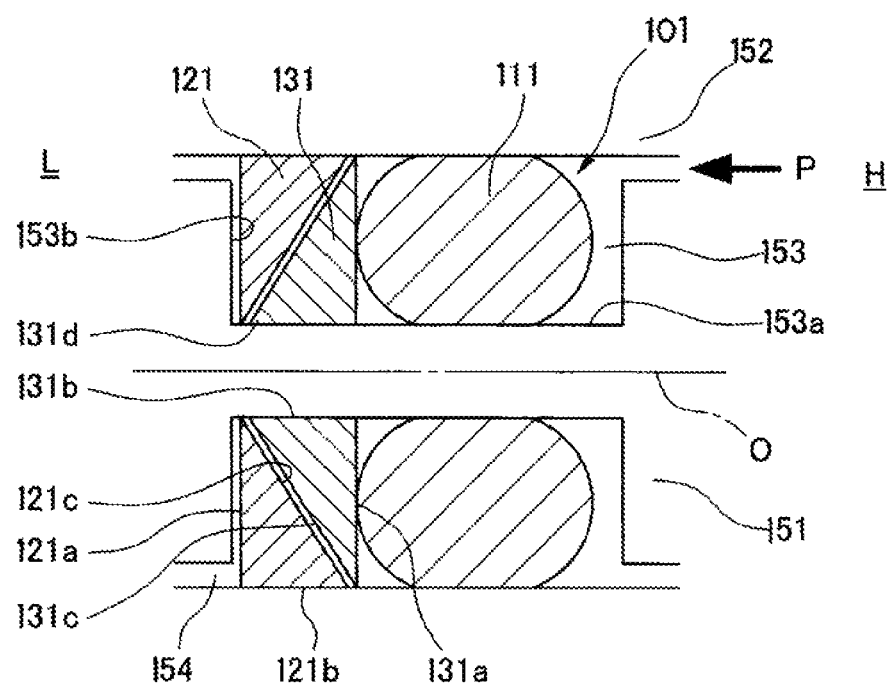
FIG. 3 is a sectional view illustrating an example of a conventional sealing device.
Figure 4A:
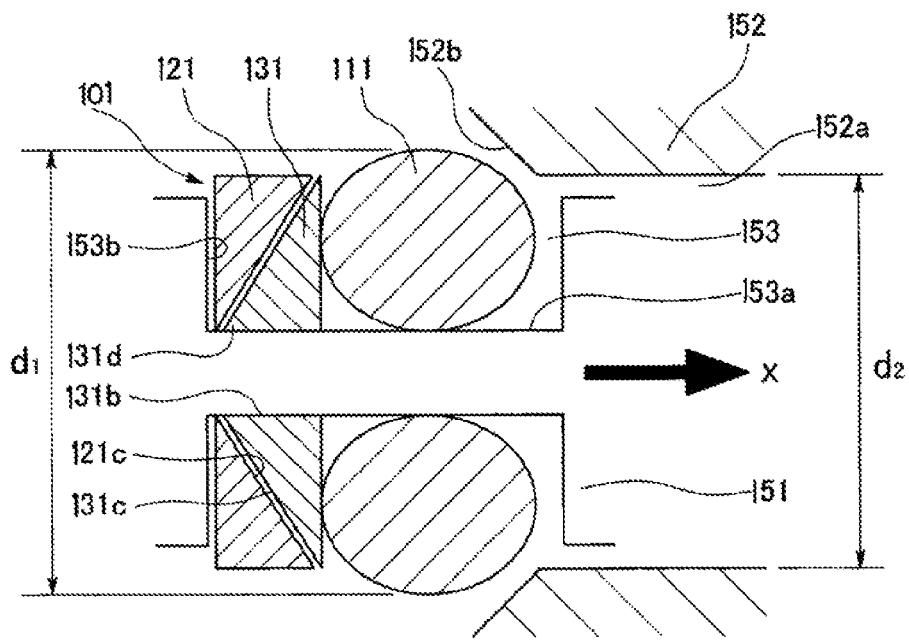
FIG. 4A is an explanatory diagram illustrating one scene of a step of the mounting process of the sealing device illustrated in FIG. 3.
Figure 4B:
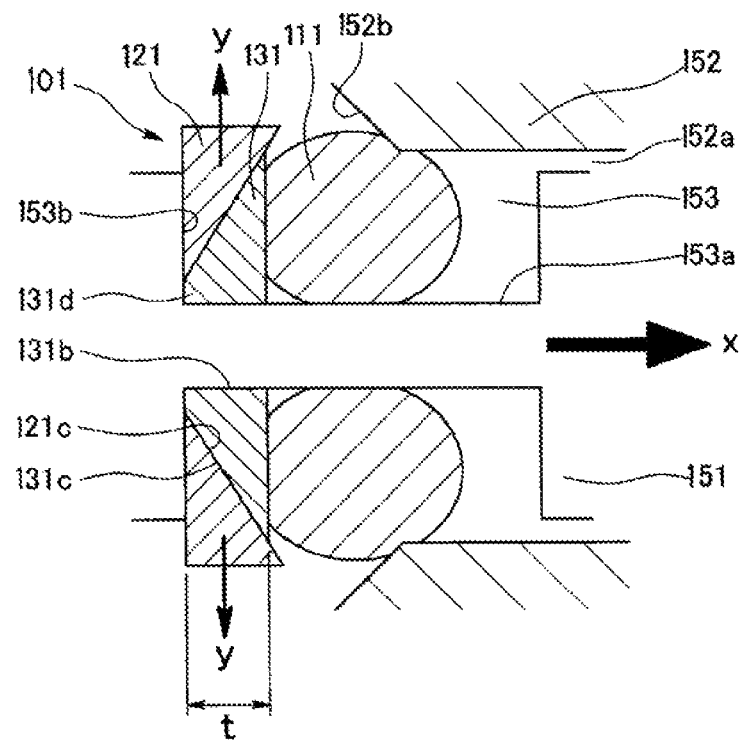
FIG. 4B is an explanatory diagram illustrating one scene following the scene of the step illustrated in FIG. 4A.

The slope 21d of the first backup ring 21 is formed to have a concave arc-shaped surface in a sectional view, the slope 31c of the second backup ring 31 is formed to have a convex arc-shaped surface in a sectional view, and the sealed-fluid-side end surface 31d of the second backup ring 31 is formed to be a concave arc-shaped surface in a section view. These surfaces 21d, 31c, and 31d are elastically deformed in shape such that the seal ring 11 is pressed against the second backup ring 31 when the high pressure P is applied to the O-ring 11 from the sealed-fluid side H, as illustrated in FIG. 2. At this time, the gap 41 disappears, thus enabling the O-ring 11 to press the second backup ring 31 (arrow A).

The second backup ring 31 that has been pressed elastically deforms such that the outer diameter dimension $d_4$ thereof increases, thus causing the second backup ring 31 to press the first backup ring 21 (arrow B).

The first backup ring 21 that has been pressed also elastically deforms such that the outer diameter dimension $d_3$ thereof increases and resultantly comes in contact with the shaft hole inner peripheral surface of the housing 52 or at least decreases the radial interval with respect to the shaft hole inner peripheral surface of the housing 52 (arrow C).

Thus, the first backup ring 21, which elastically deforms outward in the radial direction as described above, exhibits the sealing action, so that the first backup ring 21 is expected to provide sealing effect.

The inner periphery of the second backup ring 31 that has been pressed by the O-ring 11 is pressed against the bottom surface 53a of the mounting groove 53 in some cases (arrow D).

In such a case, the second backup ring 31 pressed against the bottom surface 53a of the mounting groove 53 exhibits the sealing action, so that the sealing effect by the second backup ring 31 can be also expected.

As described above, not only the O-ring 11 but also the first backup ring 21 and the second backup ring 31 can exhibit the sealing action, thus enabling the sealing performance of the entire sealing device 1 to be improved. In comparison with a conventional right-triangle combination, the first backup ring (the hard backup ring) 21 can be enlarged in the axial direction without considering the rising-up during the installation, so that the rigidity of the first backup ring (the hard backup ring) 21 can be increased with a resultant higher pressure resistance.

The invention claimed is:
1. A sealing device comprising:
a seal ring which is installed in a mounting groove provided in one member of two members facing each other and which is brought in close contact with the other member;
a first backup ring disposed at a step which is provided on a non-sealed-fluid side in the mounting groove and which decreases a depth of the mounting groove; and
a second backup ring which is disposed, in the mounting groove, between the seal ring and the first backup ring at a part other than the step and which is softer than the first backup ring,
wherein the first backup ring includes:
a bottom-surface-side peripheral surface which faces a bottom surface of the step and an axial length of which is set to a length that is equal to or less than an axial length of the bottom surface of the step;

an end surface which faces a non-sealed-fluid-side side surface of the step;
a peripheral surface which is adjacent to the other member and which faces the other member; and
a slope which inclines such that the axial length of the bottom-surface-side peripheral surface is shorter than the axial length of the peripheral surface adjacent to the other member, and the second backup ring includes:
a peripheral surface which faces a bottom surface of the mounting groove;
a non-sealed-fluid-side end surface facing a non-sealed-fluid-side side surface of the mounting groove;
a slope facing the slope of the first backup ring; and
a sealed-fluid-side end surface facing a non-sealed-fluid-side side surface of the seal ring, wherein the non-sealed-fluid-side surface of the seal ring is a convex arc-shaped surface in a sectional view, and
the sealed fluid side end surface of the second backup ring is a concave arc-shaped surface in a sectional view, the concave arc-shaped surface having a curvature radius that is larger than that of the non-sealed-fluid-side side surface of the seal ring.

2. The sealing device according to claim 1,
wherein the seal ring is an O-ring.

3. The sealing device according to claim 1,
wherein the slope of the first backup ring has a concave arc-shaped surface in a sectional view, and
the slope of the second backup ring has a convex arc-shaped surface in a sectional view.

* * * * *